(12) United States Patent
Ma et al.

(10) Patent No.: US 8,083,190 B1
(45) Date of Patent: Dec. 27, 2011

(54) ANGULAR ADJUSTMENT MECHANISM

(75) Inventors: Mou-Ming Ma, Taipei Hsien (TW); Shu-I Chen, Taipei Hsien (TW)

(73) Assignee: Giga-Byte Technology Co., Ltd, Taipei (TW)

( * ) Notice: Subject to any disclaimer, the term of this patent is extended or adjusted under 35 U.S.C. 154(b) by 0 days.

(21) Appl. No.: 12/876,419

(22) Filed: Sep. 7, 2010

(51) Int. Cl.
*F16M 11/14* (2006.01)

(52) U.S. Cl. .................. 248/181.1; 248/128; 248/184.1; 403/57

(58) Field of Classification Search ............... 248/276.1, 248/288.31, 229.25, 229.15, 227.2, 230.6, 248/231.71; 403/57, 53, 113, 114; 108/68, 108/66, 95
See application file for complete search history.

(56) References Cited

U.S. PATENT DOCUMENTS

| | | | | |
|---|---|---|---|---|
| 362,405 | A * | 5/1887 | Tompkins | 440/107 |
| 3,047,863 | A * | 7/1962 | Bolie | 342/422 |
| 4,672,786 | A * | 6/1987 | Peppers | 451/430 |
| 5,286,129 | A * | 2/1994 | French et al. | 403/24 |
| 5,314,425 | A * | 5/1994 | Shpigel | 606/53 |
| 5,440,839 | A * | 8/1995 | Piltingsrud | 49/342 |
| 6,764,051 | B2 * | 7/2004 | Knight | 248/128 |

* cited by examiner

*Primary Examiner* — Amy Sterling
*Assistant Examiner* — Erin W Smith
(74) *Attorney, Agent, or Firm* — Chun-Ming Shih

(57) ABSTRACT

An adjustment mechanism includes a limiting unit formed with a first channel and a second channel lying along first and second planes, a lower clamping unit having a U structure and being received within the first channel, a bottom seat unit disposed below and supporting the lower clamping unit from underneath, an upper clamping unit having inverted U structure and being received within the second channel such that the lower and upper clamping units are located at two opposite sides of the limiting unit with the first and second planes crossing each other perpendicularly. A top cover unit is disposed above and connected to the upper clamping unit. Adjusting position of the lower clamping unit and the limiting unit along the first plane and the upper clamping unit and the limiting unit along the second plane results in changing an angular position of the cover unit relative to the bottom seat unit.

11 Claims, 7 Drawing Sheets

ANGULAR ADJUSTMENT MECHANISM

BACKGROUND OF THE INVENTION

1. Field of the Invention

The present invention relates to an angular adjustment mechanism, more particularly to an angular adjustment mechanism for use in an operation device such that the operation device can be adjusted in three-dimensional directions relative to a support base.

2. Description of the Prior Art

Nowadays, the use of PCs (personal computers) becomes longer and longer as days passed by, and a keyboard or mouse is generally used as an input device. Long term use of PC (personal computer) usually discomforts and fatigues a user's hands and muscles. In order to remedy the muscle strain or hand's fatigue of the computer operator, keyboard or mouse of present days are designed and constructed ergonomically to suit an individual needs.

However, the abovementioned keyboard or mouse is constructed generally as a stand-alone device, that is, the article is movable on a support surface but its structure is not designed ergonomically to fit an individual user or its angular position relative to an individual user is unable to be adjusted, thereby unable to satisfy the individual user of the computer set.

SUMMARY OF THE INVENTION

In order to remedy the aforesaid drawbacks, the object of the present invention is to provide an angular adjustment mechanism that is to be applied in an operation device such that the device can be adjusted in three dimensional directions and changing of the inclination position of the operation device is suitable for an individual user since the individual user can adjust the device according to his or her required inclination or angle.

The angular adjustment mechanism of the present invention accordingly includes a limiting unit, a lower clamping unit, a bottom seat unit, an upper clamping unit and a top cover unit. The limiting unit is formed with a first guiding channel lying along a first imaginary plane and a second guiding channel lying along a second imaginary plane. The lower clamping unit has a U-shaped structure and is received within the first guiding channel along the first imaginary plane. The bottom seat unit is disposed below and supports the lower clamping unit from underneath. The upper clamping unit has an inverted U-shaped structure and is received within the second guiding channel along the second imaginary plane such that the lower and upper clamping units are located at two opposite sides of the limiting unit with the first and second imaginary planes crossing each other perpendicularly. The top cover unit is disposed above and is connected to the upper clamping unit.

When adjusting position of the lower clamping unit and the limiting unit along the first imaginary plane and the upper clamping unit and the limiting unit along the second imaginary plane results in changing an angular position of the top cover unit relative to the bottom seat unit.

The angular adjustment mechanism of the present invention further includes a fixing member in the form of an annular structure and surrounding the limiting unit in such a manner that portions of the lower and upper clamping units are clamped between the fixing member and the limiting unit, thereby disposing the top cover unit at an inclination position relative to the bottom seat unit.

As mentioned above, the angular adjustment mechanism of the present invention can be applied in an operation device in order to alter an inclination of the operation device. Changing of the inclination position of the operation device is fitting workplace conditions, hence is effective since conforming to ergonomics. In addition, it is easy to manipulate the adjustment mechanism of the present invention in three dimensional directions and is suitable for every individual user, because each individual user can adjust the device to a specific or required inclination in accordance to his or her desire and wishes.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
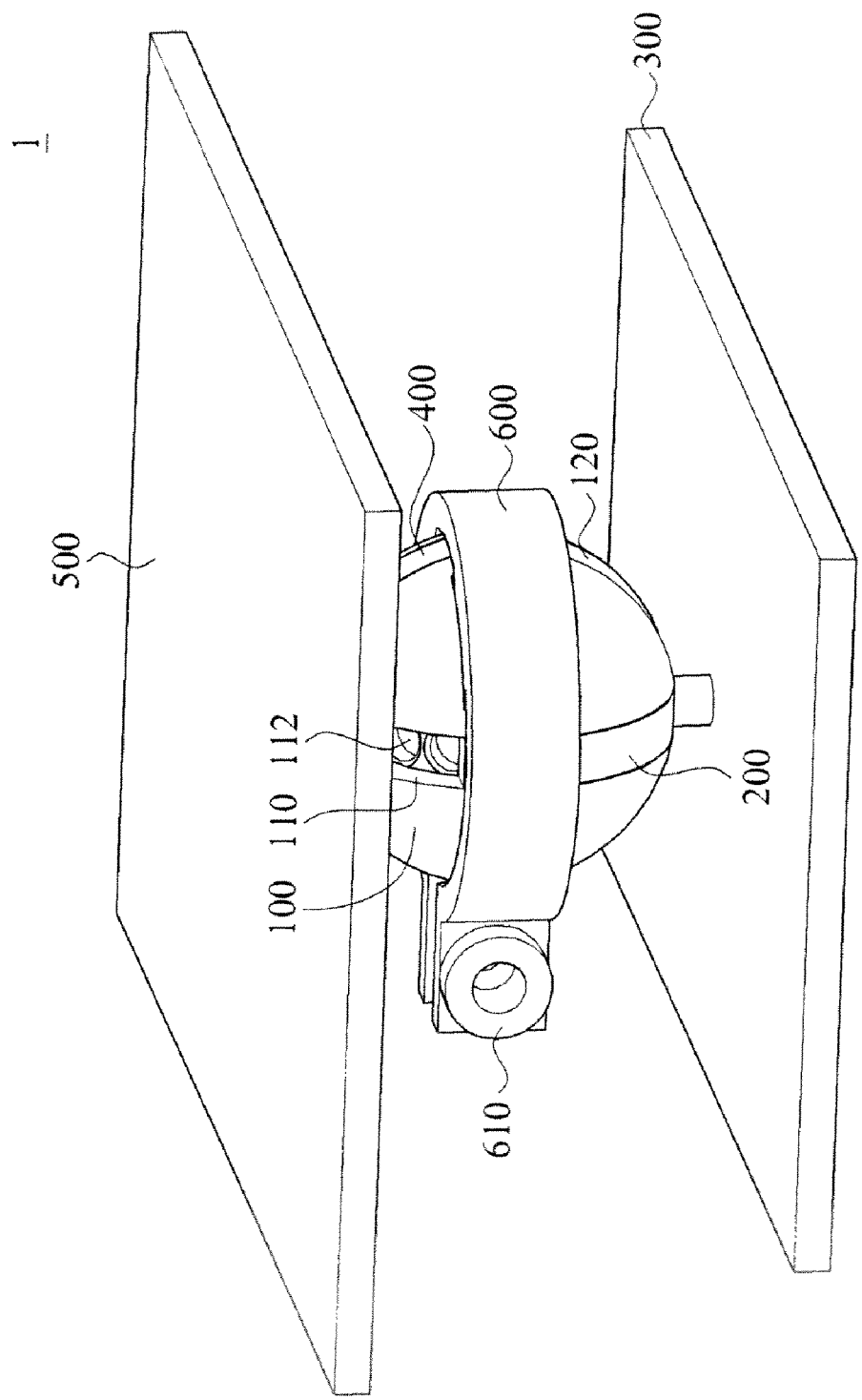
FIG. 1 is a perspective view of an angular adjustment mechanism of the present invention.
Figure 2:
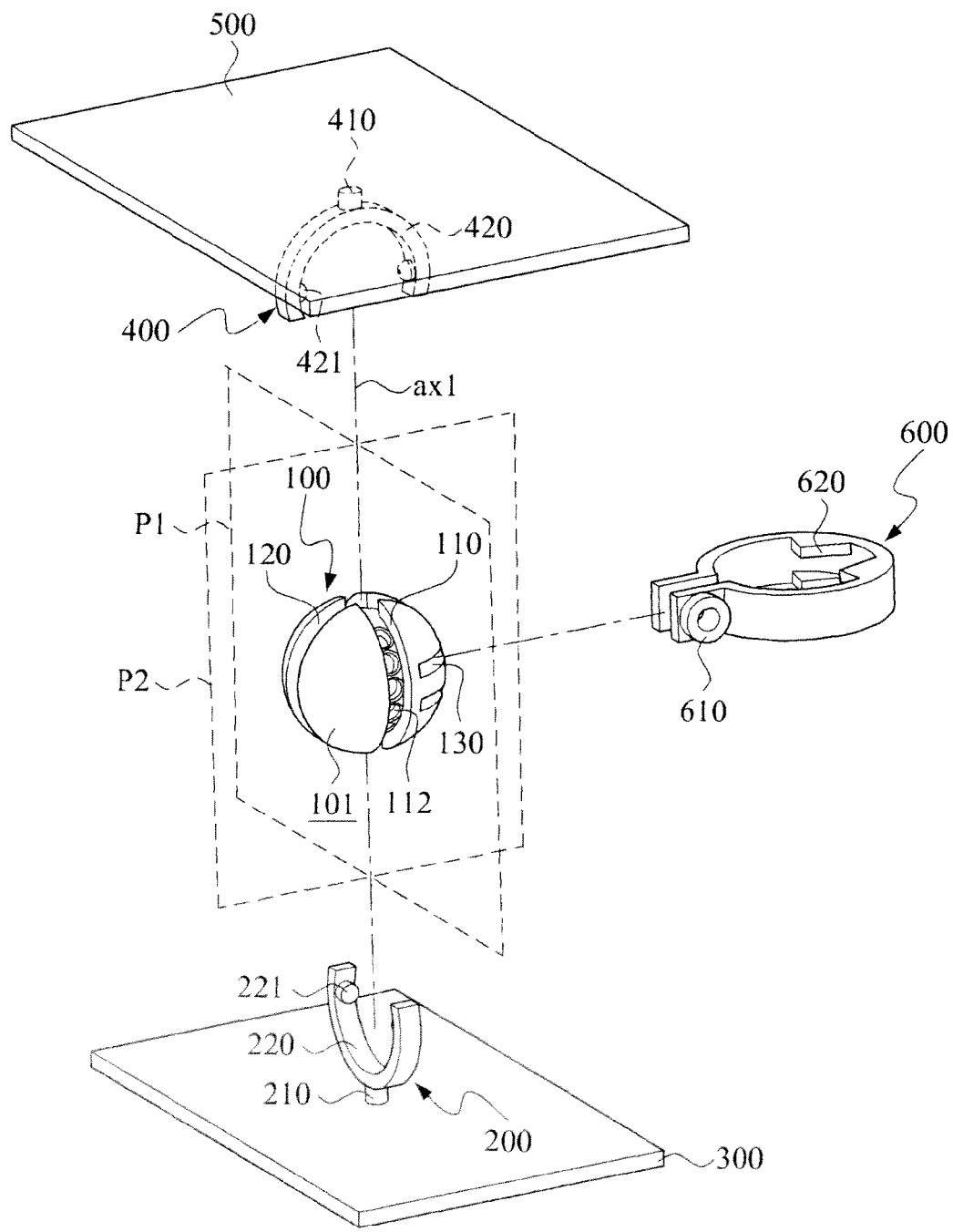
FIG. 2 is an exploded view of the angular adjustment mechanism of the present invention.

Referring to FIGS. 1 and 2, wherein FIG. 1 shows a perspective view of an angular adjustment mechanism 1 of the present invention while FIG. 2 shows an exploded view of the angular adjustment mechanism 1 of the present invention.

The angular adjustment mechanism 1 of the present invention is applied within an operation device or is used to support the operation device thereabove. The operation device can be a keyboard, mouse or joystick of a personal computer set. In the event, the angular adjustment mechanism 1 of the present invention is applied within the operation device, the top cover unit 500 and the bottom seat unit 300 of the angular adjustment mechanism 1 respectively serve as upper and lower casing halves (not shown) of the operation device or the top cover unit 500 serves as the lower casing half of the operation device. In addition, in the event the angular adjustment mechanism 1 of the present invention is used to support the operation device thereabove, the operation device should be fixed or mounted on the top cover unit 500. Under this condition, the individual user can use the angular adjustment mechanism 1 of the present invention to adjust the angular position of the top cover unit 500 relative to the bottom seat unit 300, thereby conforming to the ergonomic ability of an individual user.

Figure 3:
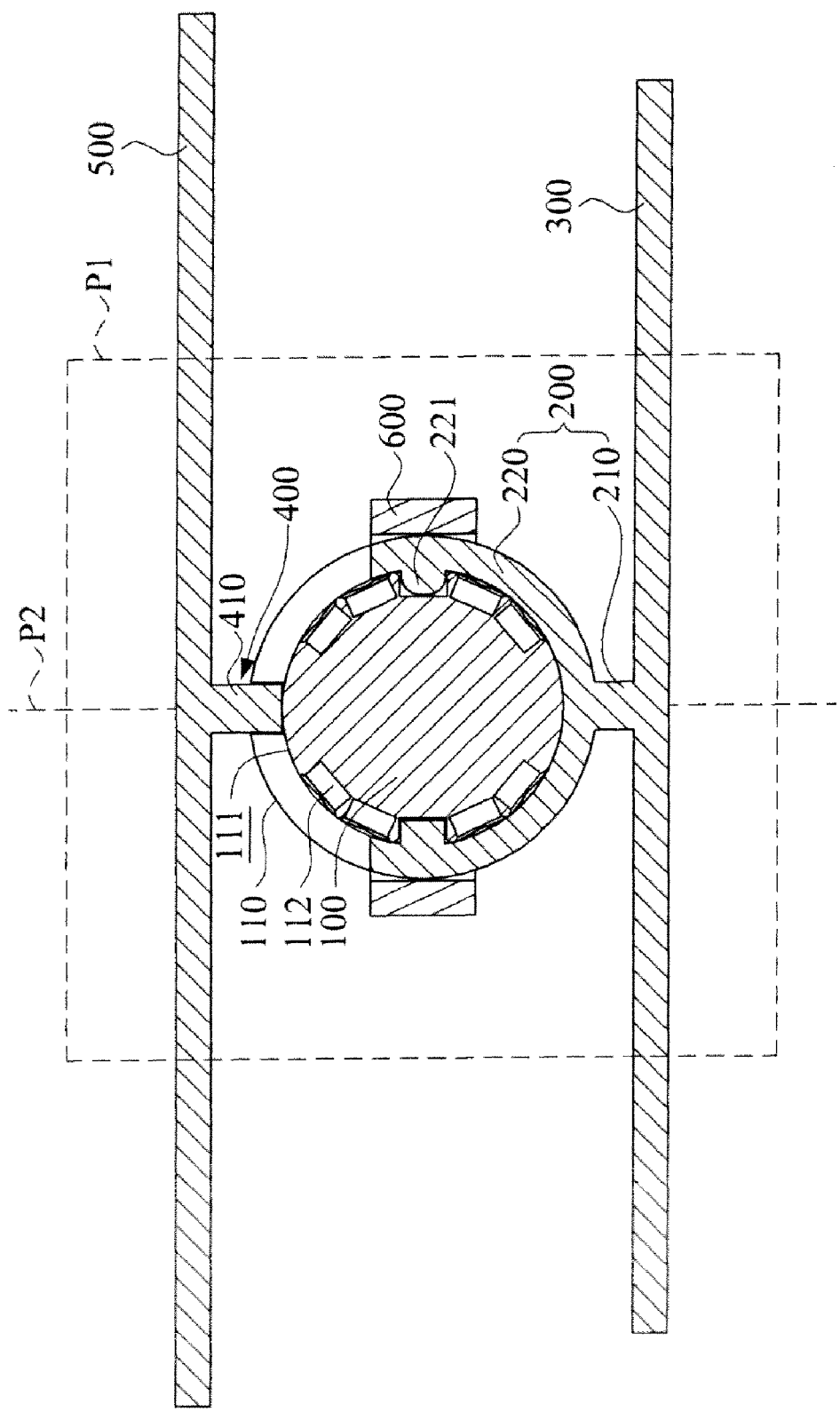
FIG. 3 is a cross-sectional view of the angular adjustment mechanism of the present invention along a first imaginary plane.
Figure 4:
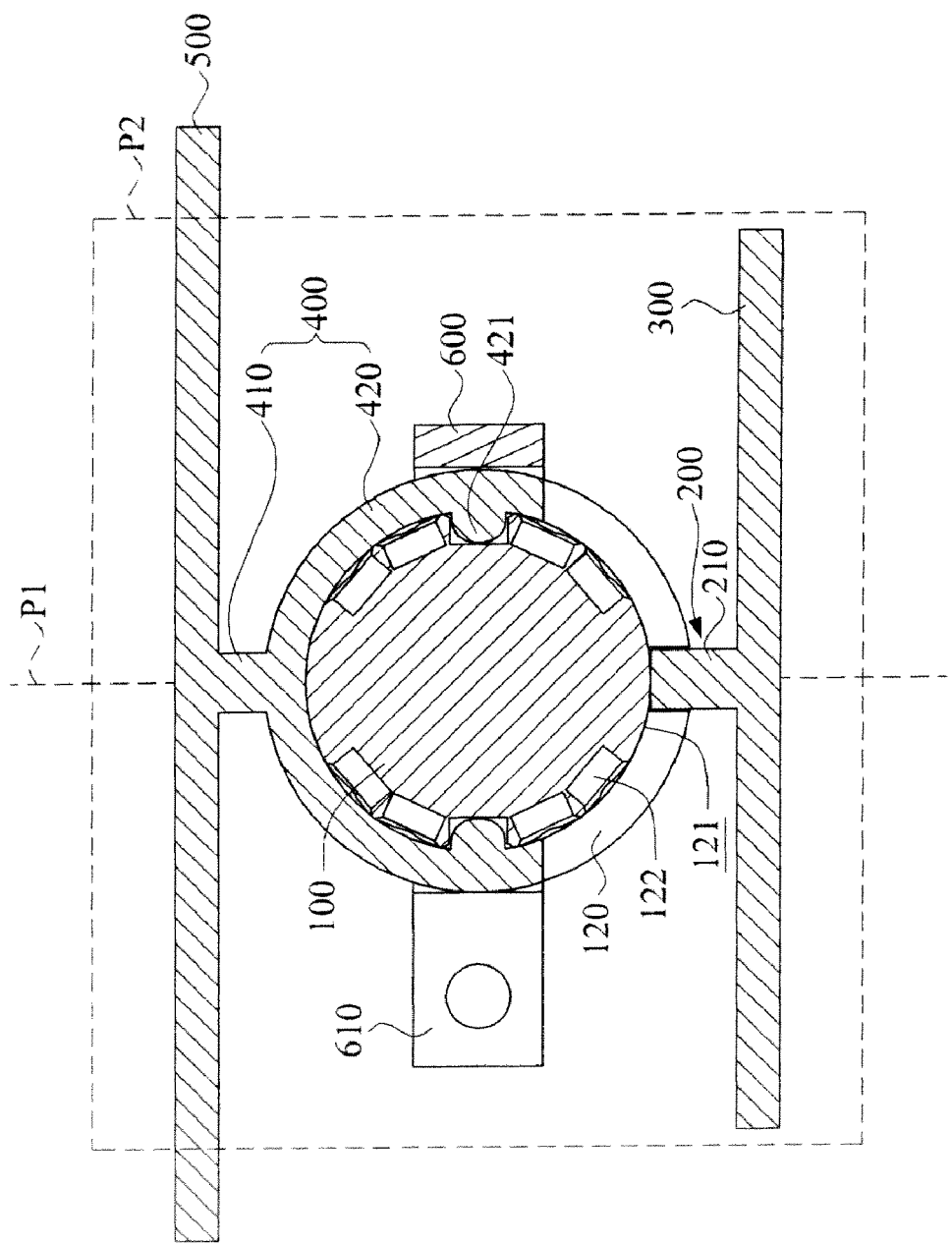
FIG. 4 is a cross-sectional view of the angular adjustment mechanism of the present invention along a second imaginary plane.

Referring to FIGS. 2 to 4, wherein FIG. 3 is a cross-sectional view of the angular adjustment mechanism 1 of the present invention along a first imaginary plane P1 while FIG. 4 is a cross-sectional view of the angular adjustment mechanism of the present invention along a second imaginary plane P2, which crosses the first imaginary plane P1 perpendicularly to define an axis ax1, since the limiting unit 100 is a ball structure, see the following paragraphs.

The angular adjustment mechanism 1 of the present invention accordingly includes a limiting unit 100 (in the form of a ball body), a lower clamping unit 200, a bottom seat unit 300, an upper clamping unit 400, a top cover unit 500 and a fixing member 600. In this preferred embodiment, the limiting unit 100 in fact is a fully rounded ball body; however the limitation should not be limited thereto only. The limiting unit 100 is formed with a first guiding channel 110 and a second guiding channel 120.

The limiting unit 1 includes a ball body having an exterior surface 101 dented to form the first guiding channel 110 therein surrounding the ball body and lying along the first imaginary plane P1 crossing the axis ax1. Thus, the first guiding channel 110 has a bottom wall 111 circumferentially surrounding the ball body. The bottom wall 111 of the first guiding channel 110 is formed with a plurality of spaced-apart first retention holes 112.

The exterior surface 101 of the ball body is further dented to form the second guiding channel 120 therein surrounding the ball body and lying along the second imaginary plane P2 crossing the axis ax1. Thus, the second guiding channel 120 has a bottom wall 121 circumferentially surrounding the ball body and lying along the second imaginary plane P2. The bottom wall 121 of the second guiding channel 120 is formed with a plurality of spaced-apart second retention holes 122 (see FIG. 4).

The lower clamping unit 200 is a U-shaped structure and is received within the first guiding channel 110 along the first imaginary plane P1. The lower clamping unit 200 further includes a bottom connecting stub 210, two clamping lower arms 220 and a pair of lower limiting projections 221. The bottom connecting stub 210 is used for connecting to the bottom seat unit 300. The two clamping lower arms 220 extend curvedly and upwardly from the bottom connecting stub 210 along the first imaginary plane P1 in order to conform to the bottom wall 111 of the first guiding channel 110 in the exterior surface 101 of the ball body.

The lower limiting projections 221 project inwardly from two opposite ends of the lower arms 220 and extending into a corresponding pair of the first retention holes 112 in the first guiding channel 110.

The upper clamping unit 400 is an inverted U-shaped structure and is received within the second guiding channel 120 along the second imaginary plane P2 such that the lower and upper clamping units 200, 400 are located at two opposite sides of the ball body with the first and second imaginary planes P1, P2 crossing each other perpendicularly. The upper clamping unit 400 further includes an upper connecting stub 410, two clamping upper arms 420 and a pair of upper limiting projections 421. The upper connecting stub 410 is used for connecting to the top cover unit 500 from below. The two clamping upper arms 420 extend curvedly and downwardly from the upper connecting stub 410 along the second imaginary plane P2 in order to conform to the bottom wall 121 of the second guiding channel 120 in the exterior surface 101 of the ball body.

The upper limiting projections 421 project inwardly from two opposite ends of the upper arms 420 and extending into a corresponding pair of the second retention holes 122 in the second guiding channel 120.

Since the top cover unit 500 is connected to the upper clamping unit 400, the top cover unit 500 can be constructed as a plate member similar to that shown in FIG. 2 in order to support the operation device thereabove. In addition, the top cover unit 500 may also serve as upper or lower casing half of the operation device (not shown). For instance, if the operation device is a mouse for PC (personal computer), the top cover unit 500 can be designed and constructed in dome shaped in order to permit gripping of the computer user or the top cover unit 500 can be designed and constructed for serving a lower casing half so that an upper casing half can be mounted on the lower casing half.

The bottom seat unit 300 is disposed below and supports the lower clamping unit 200 from underneath. The bottom seat unit 300 can be constructed as a plate member similar to that shown in FIG. 2 in order to serve as the lower casing half of the operation device. For instance, if the operation device is a mouse for PC, the bottom seat unit 300 can be designed and constructed as the lower casing half while the top cover unit 500 can be designed and constructed for serving as the upper casing half so that the upper casing half can be mounted on the lower casing half.

The angular adjustment mechanism 1 of the present invention further includes a fixing member 600 in the form of an annular structure and surrounding the ball body in such a manner that at least portions of the lower and upper clamping units 200, 400 are clamped between the fixing member 600 and the limiting unit 100. In this preferred embodiment, the fixing member 600 is generally C-shaped and has two distal ends provided with a fastening structure 610 for fastening the distal ends when required. The exterior surface 101 of the ball body is formed with a pair of upper and lower engagement recesses 130 (see FIG. 2). The fixing member 600 further has upper and lower pairs of engaging blocks 620 formed on an interior thereof and respectively engaging the engagement recesses 130 in the exterior surface 101 of the ball body. As illustrated in FIG. 1, when the fixing member 600 is disposed around and fasten the limiting unit 100 therein, the lower arms 220 and the upper arms 420 are prevented respectively disengaging from the first and second guiding channels 110, 120. In other words, the lower limiting projections 221 and the upper limiting projections 421 are respectively prevented untimely disengaging from the first retention holes 112 in the first guiding channel 110 and the second retention holes 122 in the second guiding channel 120.

Figure 5:
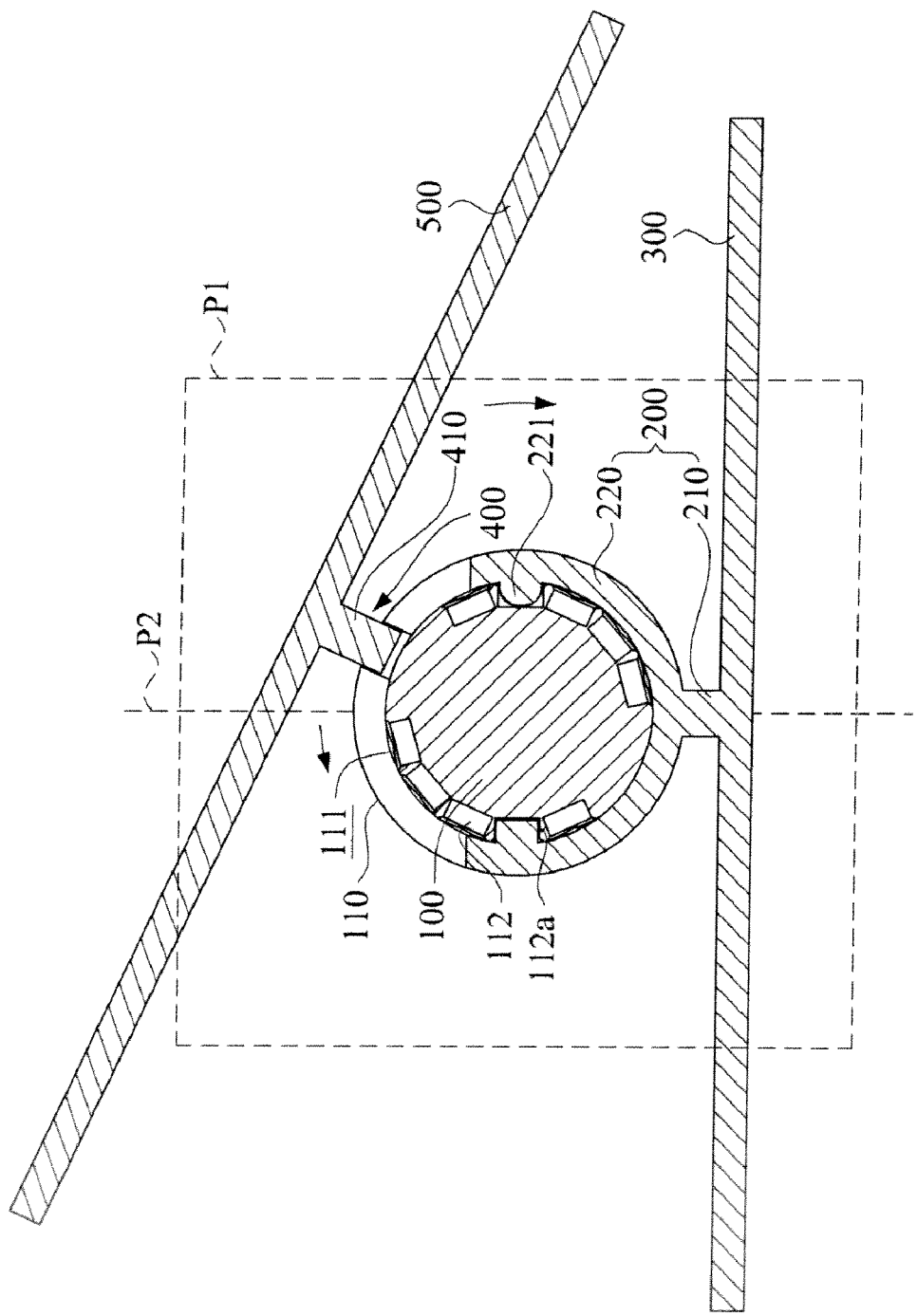
FIGS. 5 to 7 respectively show three different angular positions of the angular adjustment mechanism of the present invention relative to a support base.
Figure 6:
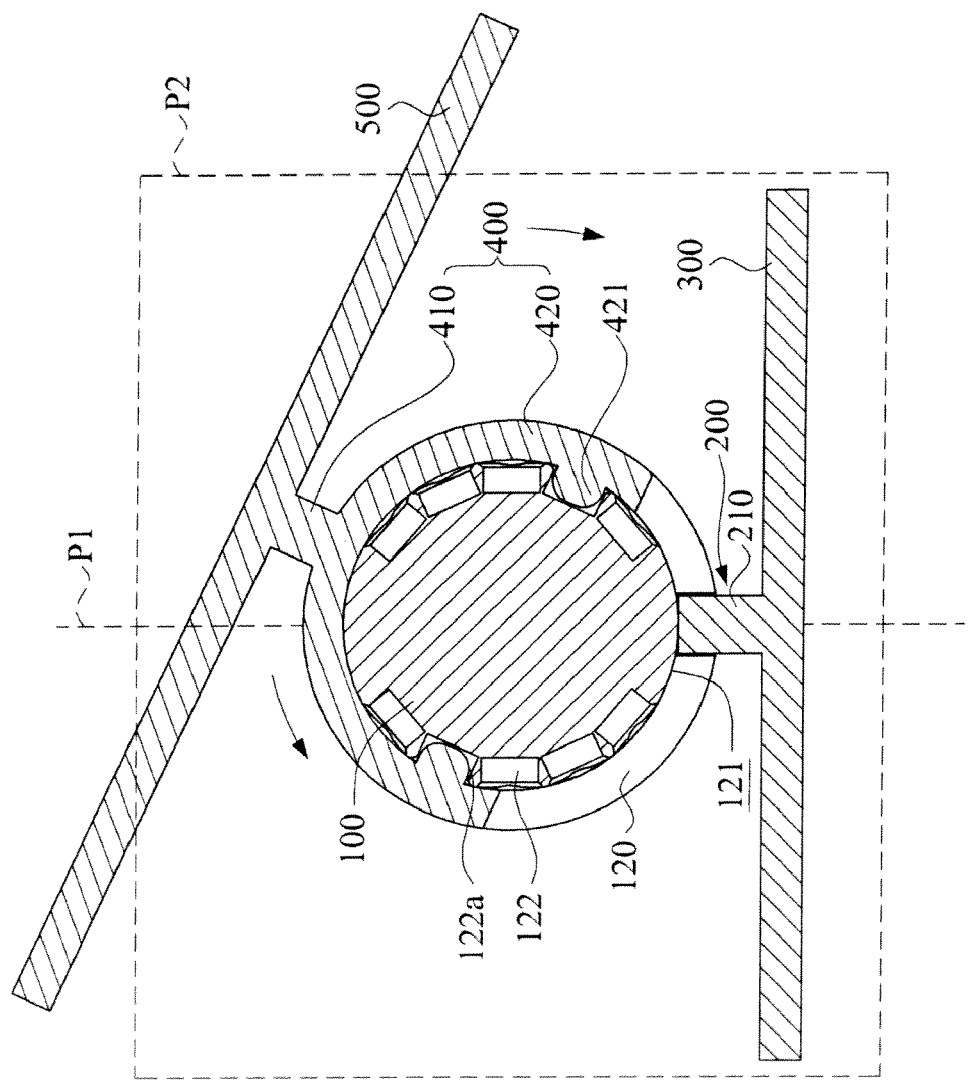
Figure 7:
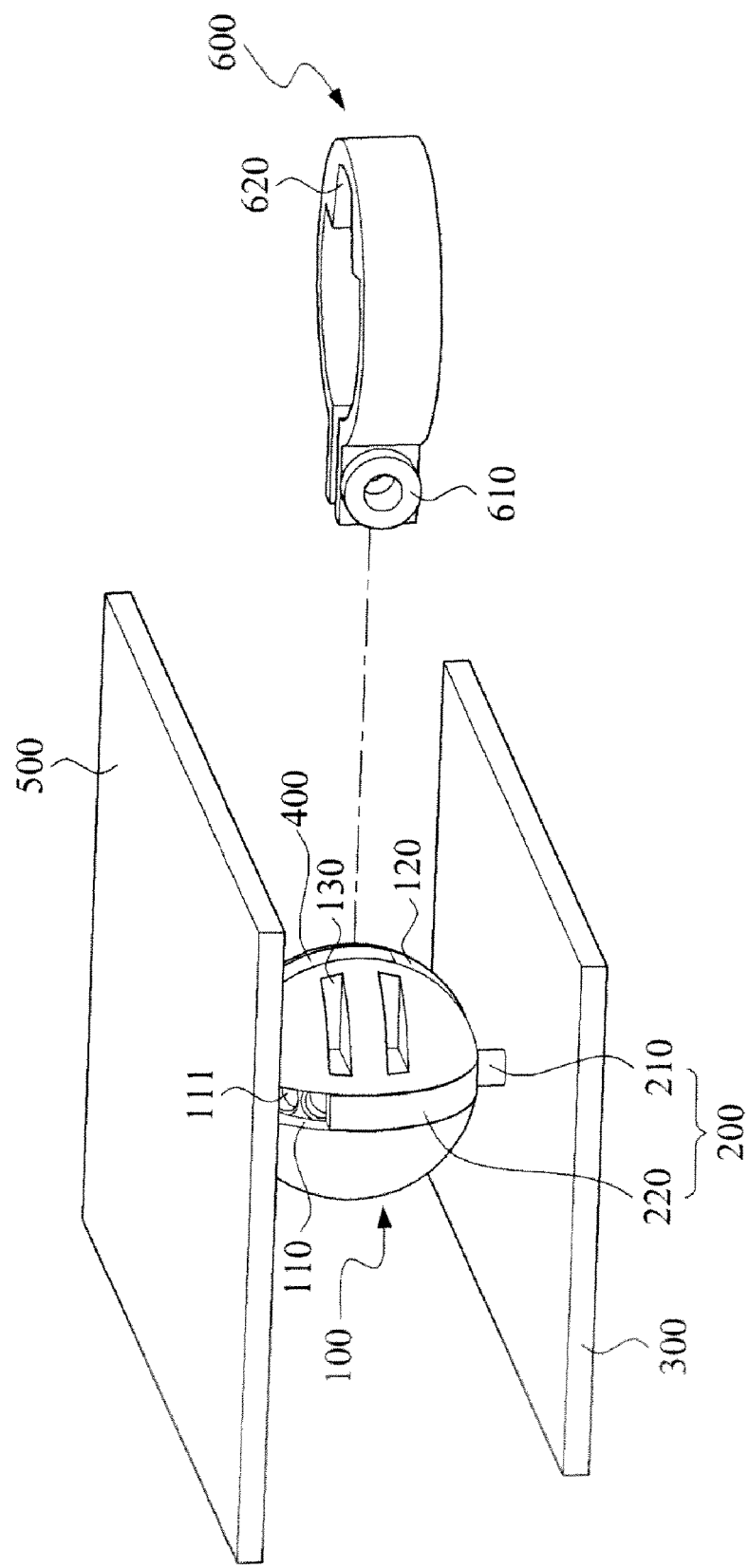

Referring to FIGS. 5 to 7, wherein FIGS. 5 to 7 respectively show three different angular positions of the angular adjustment mechanism 1 of the present invention relative to a support base. When it is desired to alter an angular position of the adjustment mechanism 1 of the present invention, you must first of all disassemble the fixing member 600 from the limiting unit 100. Then, you can rotate an assembly of the limiting unit 100 and the lower clamping unit 200 relative the first imaginary plane P1 so as to alter the angular position of the limiting unit 100 and the lower clamping unit 200, hence the position of the top cover unit 500 changes relative to the bottom seat unit 300. To be more specific, as best shown in FIG. 5, the lower limiting projections 221 disengage from the pair of the first retention holes 112 and later extend and engage another pair the first retention holes 112a, thereby disposing the top cover unit 500 at an inclination position relative to the bottom seat unit 300.

In the same manner, an assembly of the limiting unit 100 and the upper clamping unit 400 can be rotated relative to the second imaginary plane P2 so as to alter the angular position of the top cover unit 500 relative to the bottom seat unit 300. To be more specific, as best shown in FIG. 6, the upper limiting projections 421 disengage from the pair of the second retention holes 122 and later extend and engage another pair the second retention holes 122a, thereby disposing the top cover unit 500 at an inclination position relative to the bottom seat unit 300. Since the position of the top cover unit 500 can be changed relative to the first and second imaginary planes P1, P2 as well as the horizontal plane, the top cover unit 500 is changeable relative to the bottom seat unit 300 in three dimensional directions.

As best shown in FIG. 7, after adjusting the position of the top cover unit 500 relative to the first and second imaginary planes P1, P2 and later relative to the bottom seat unit 300, you can fasten the fixing member 600 again around the limiting unit 100, thereby firmly securing the limiting unit 100, and the upper and lower clamping units 400, 200 therearound.

As explained above, the angular adjustment mechanism 1 of the present invention can be applied in an operation device in order to alter an inclination of the operation device and changing of the inclination position of the operation device is fitting workplace conditions, hence is effective since conforming to ergonomics. In addition, it is easy to manipulate the adjustment mechanism 1 of the present invention in three dimensional directions and is suitable for every individual user, because each individual user can adjust the device to a specific or required inclination in accordance to his or her desire and wishes.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An angular adjustment mechanism comprising:
   a limiting unit formed with a first guiding channel lying along a first imaginary plane and a second guiding channel lying along a second imaginary plane, wherein said first guiding channel has a bottom wall formed with a plurality of spaced-apart first retention holes while said second guiding channel has a bottom wall formed with a plurality of spaced-apart second retention holes;
   a lower clamping unit having a U-shaped structure and being received within said first guiding channel along said first imaginary plane;
   a bottom seat unit disposed below and supporting said lower clamping unit from underneath;
   an upper clamping unit having an inverted U-shaped structure and being received within said second guiding channel along said second imaginary plane such that said lower and upper clamping units are located at two opposite sides of said limiting unit with said first and second imaginary planes crossing each other perpendicularly; and
   a top cover unit disposed above and connected to said upper clamping unit;
   wherein, adjusting position of said lower clamping unit and said limiting unit along said first imaginary plane and said upper clamping unit and said limiting unit along said second imaginary plane results in changing an angular position of said top cover unit relative to said bottom seat unit.

2. The angular adjustment mechanism according to claim 1, wherein said lower clamping unit further includes
   a bottom connecting stub for connecting to said bottom seat unit, and
   two clamping lower arms extending curvedly and upwardly from said bottom connecting stub in order to conform to an exterior surface of said limiting unit.

3. The angular adjustment mechanism according to claim 1, wherein said upper clamping unit further includes
   an upper connecting stub for connecting to said top cover unit from below, and
   two clamping upper arms extending curvedly and downwardly from said upper connecting stub in order to conform to an exterior surface of said limiting unit.

4. The angular adjustment mechanism according to claim 1, wherein said limiting unit has an exterior surface dented to form said first guiding channel therein lying along said first imaginary plane and further dented to form said second guiding channel therein lying along said second imaginary plane.

5. The angular adjustment mechanism according to claim 1, wherein said lower clamping unit further has a pair of lower limiting projections projecting inwardly from two opposite ends thereof and extending into a corresponding pair of said first retention holes in said first guiding channel, said upper clamping unit further having a pair of upper limiting projections projecting inwardly from two opposite ends thereof and extending into a corresponding pair of said second retention holes in said second guiding channel.

6. The angular adjustment mechanism according to claim 1, further comprising a fixing member in the form of an annular structure and surrounding said limiting unit in such a manner that at least portions of said lower and upper clamping units are clamped between said fixing member and said limiting unit.

7. The angular adjustment mechanism according to claim 6, wherein said fixing member is generally C-shaped and has two distal ends provided with a fastening structure.

8. The angular adjustment mechanism according to claim 7, wherein said exterior surface of said limiting unit is formed with an engagement recess, said fixing member further having an engaging block formed on an interior thereof and engaging said engagement recess in said exterior surface of said limiting unit.

9. The angular adjustment mechanism according to claim 1 is applied in an operation device such that said top cover unit and said bottom seat unit respectively serve as upper and lower casing halves of said operation device.

10. The angular adjustment mechanism according to claim 1 is used to support an operation device thereabove such that said operation device is mounted on said top cover unit.

11. The angular adjustment mechanism according to claim 1 is used to support an operation device thereabove such that said top cover unit serves as a lower casing half of said operation device.

* * * * *